United States Patent
Ratcliff

[11] 3,901,024
[45] Aug. 26, 1975

[54] CLAW TYPE GRAB HOOK

[76] Inventor: Ralph A. Ratcliff, 614 Mountain View Ave., Belmont, Calif. 94002

[22] Filed: Nov. 15, 1973

[21] Appl. No.: 416,188

[52] U.S. Cl. .................................................. 59/93
[51] Int. Cl. ........................................... F16g 15/04
[58] Field of Search .......... 59/93; 294/82 R, 74, 75, 294/78 R

[56] References Cited
UNITED STATES PATENTS

| 2,878,640 | 3/1959 | Johnson | 59/93 |
| 3,193,253 | 7/1965 | Ratcliff | 294/78 R |
| 3,271,007 | 9/1966 | Ratcliff | 254/78 |
| 3,333,412 | 8/1967 | Rieger | 59/93 |
| 3,591,141 | 7/1971 | Ratcliff | 254/78 |

Primary Examiner—C. W. Lanham
Assistant Examiner—Gene P. Crosby
Attorney, Agent, or Firm—Flehr, Hohbach, Test, Albritton & Herbert

[57] ABSTRACT

An improved grab hook member for engagement with a link of a coil chain. The hook member is designed so that it may be moved laterally and rotated into engagement with the chain to apply tension to the chain without twisting or otherwise distorting or damaging the chain in the fashion characteristic of prior known grab hooks.

6 Claims, 10 Drawing Figures

PATENTED AUG 26 1975
SHEET 1 OF 2
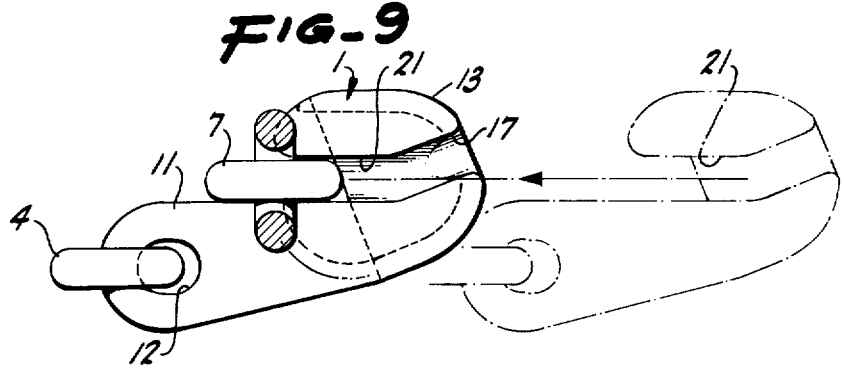
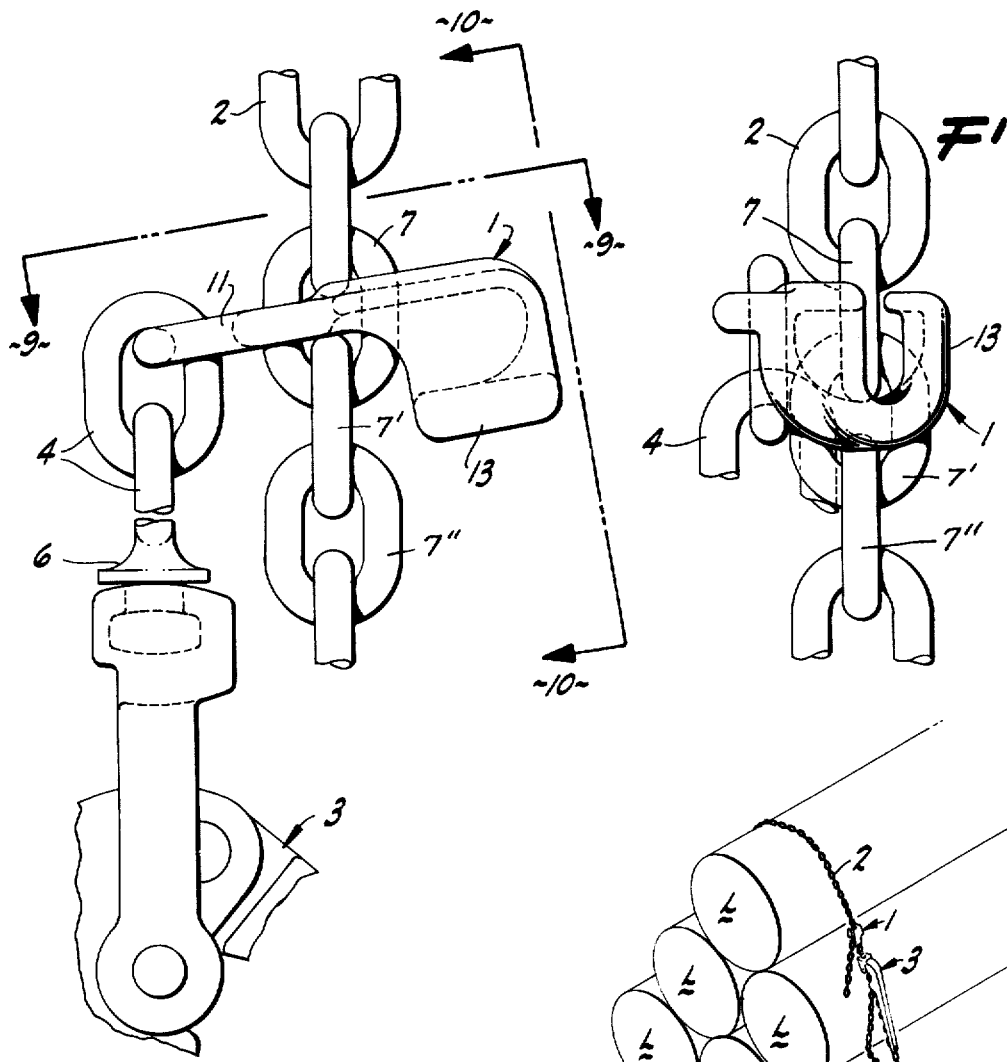
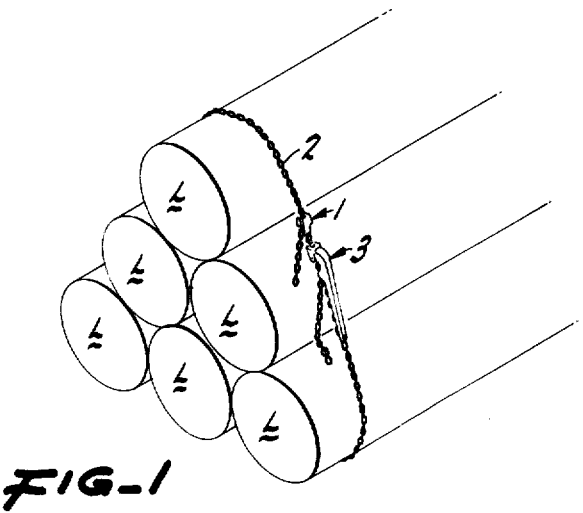

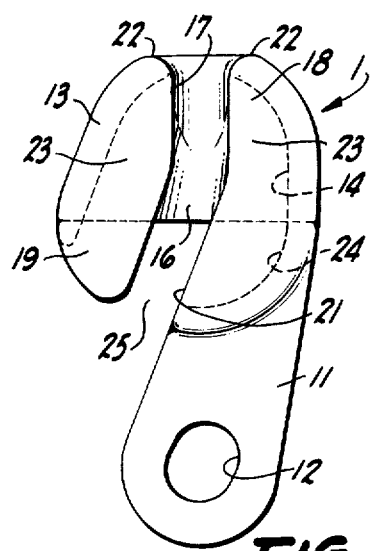
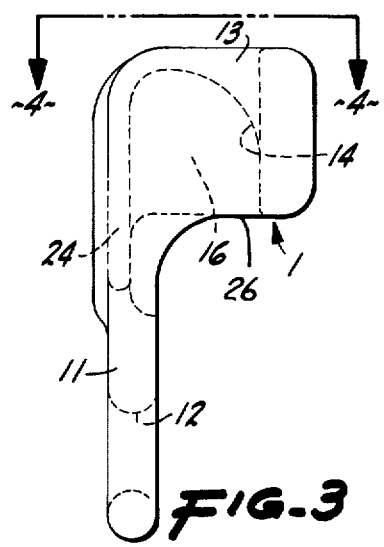
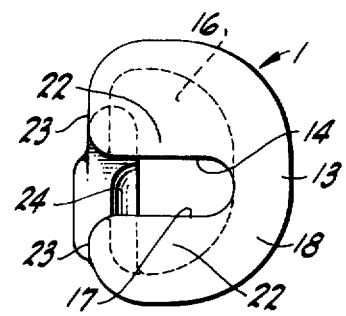
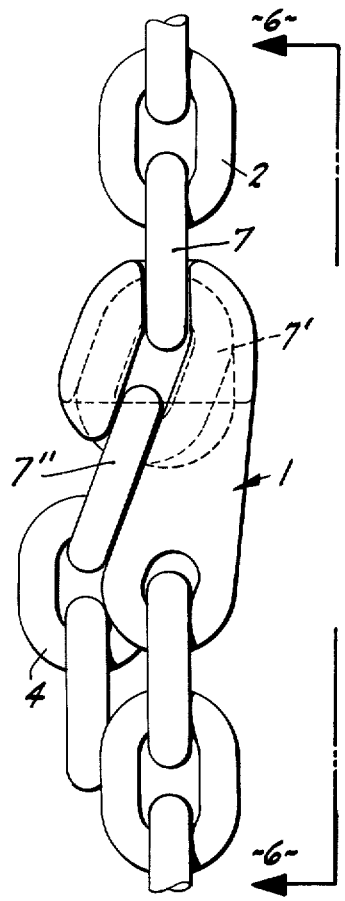
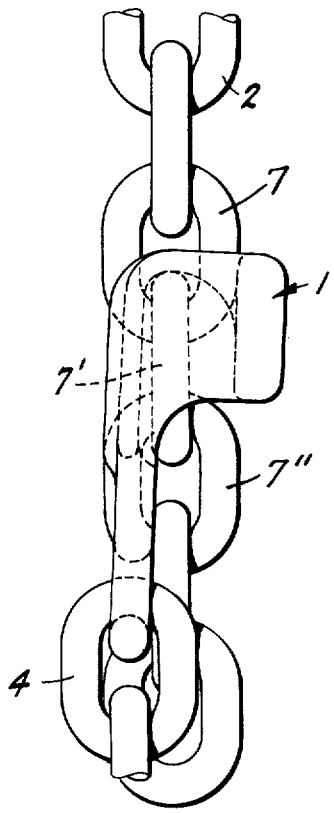
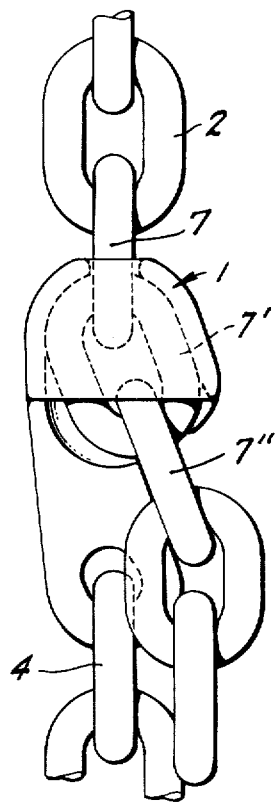

CLAW TYPE GRAB HOOK

BACKGROUND OF THE INVENTION

1. Field of the Invention

This invention relates generally to the field of hook type load sustaining devices. More particularly, this invention relates to the field of hook members for engagement with chains or other hold down or load sustaining elements. Still more particularly, this invention relates to an improved claw type grab hook for connecting the hook and any load sustaining device engaged therewith with a coil chain or like load sustaining element in an improved fashion so that damage to the chain is precluded.

2. Description of the Prior Art

Hook members for engaging a coil chain have been known in the art heretofore, including proposed improvements over conventional grab hook members which, when engaged with a chain, normally distort the same and damage the chain link with which the hook is engaged. Attempts to provide an improved device for engagement with a chain have been proposed heretofore, as disclosed by the claw type hooks illustrated in Rieger, U.S. Pat. No. 3,601,978, dated Aug. 31, 1971; Rieger, U.S. Pat. No. 3,333,412, dated Aug. 1, 1967; and German Pat. No. 830,449. Other allegedly improved devices designed for engagement with a chain include those shown in Johnson, U.S. Pat. No. 2,878,640, dated Mar. 24, 1959; and Smith, U.S. Pat. No. 2,179,564, dated Nov. 14, 1939.

In addition to the prior art patents identified above, other hook members of the claw type have been known heretofore which are designed to straddle a chain link to prevent damage thereto. Such additional claw type hook members are illustrated in Ratcliff, U.S. Pat. No. 3,271,007, dated Sept. 6, 1966 and Ratcliff, U.S. Pat. No. 3,193,253, dated July 6, 1965. While the Ratcliff claw members are improvements over the devices and hook members known prior thereto, the claw type hook members illustrated in the Ratcliff patents do not possess the improved construction and structural characteristics of the present grab hook member. However, of the patents identified above, none discloses or suggests the particular improved hook configuration and construction characteristic of the present invention which permits a hook member to be rapidly and effectively engaged with a predetermined link of a coil chain in a fashion which insures secure engagement between the hook member and the chain without distorting or damaging the chain in the fashion characteristic of prior known grab hook members.

With claw type hooks of the type known previously, it is necessary to manipulate the chain by tilting or otherwise maneuvering the same to move the chain into engagement with the claw hook. Under certain circumstances such manipulation of the chain is difficult or impossible to effect and therefore such chain manipulation is viewed by some as a disadvantage, even though a claw hook of the type shown in the Ratcliff patents precludes damage to the chain. Similarly, with conventional grab hooks which may be manipulated into engagement with the chain, rather than visa versa, chain damage is commonly caused by such a conventional grab hook engaging the chain and twisting the same when the chain is placed under load by the hook.

The present improved claw type grab hook is constructed so that the hook may be moved laterally into engagement with the chain, rather than visa versa, while at the same time incorporating therein improved structural features which preclude damage to the chain link characteristic of prior conventional grab hooks.

SUMMARY OF THE INVENTION

The present invention relates to an improved claw type grab hook designed for engagement with a predetermined link of a length of coil chain in such a fashion that damage to the chain is precluded when the chain is placed under load by a load sustaining device engaged with the improved grab hook.

This invention further relates to an improved claw type grab hook which is contoured to straddle and thereby preclude damage to a chain link. The subject hook is constructed so that the hook may be moved laterally into engagement with a link of a chain in a simple fashion which precludes the necessity to maneuver or manipulate the chain into engagement with the hook in the fashion characteristic of prior known claw type hooks.

This invention further relates to an improved claw type grab hook which is designed for engagement with a load binder, hoist, or similar load sustaining device, by means of which the load sustaining device may be operatively connected with the chain so that tension may be applied to the chain.

The present improved grab hook incorporates into a single structure the structural advantages of a claw hook of the type known heretofore (which obviates damage to the chain with which the hook is engaged) and the manipulative advantages of a conventional claw hook (which permits the hook to be engaged with the chain to facilitate such engagement, rather than visa versa).

From the foregoing it should be understood that objects of this invention include: the provision of an improved claw type grab hook; the provision of a chain engaging hook designed to be laterally movable into engagement with a predetermined link of a chain so that manipulation of the chain during interengagement thereof with a hook member is precluded; the provision of an improved claw type grab hook which may be simply and easily engaged and disengaged with a chain without requiring manipulation of the chain during such engagement or disengagement; and the provision of an improved one piece claw type grab hook designed for ease of manipulation into engagement with a chain and to insure against chain damage when the chain is subjected to tensional forces applied thereto by the hook and any load sustaining device operatively engaged with the hook.

These and other objects of this invention will become apparent from a study of the following detailed disclosure in which reference is directed to the appended drawings.

DESCRIPTION OF THE DRAWINGS

FIG. 1 is a generally schematic view showing the improved grab hook of this invention operatively connecting a load sustaining device in the form of a load binder with a length of chain positioned around a series of cylindrical objects, such as logs, to hold the same in place.

FIG. 2 is a front elevational view of the improved grab hook of this invention.

FIG. 3 is a side elevational view thereof.

FIG. 4 is a top plan view thereof taken in the plane of line 4—4 of FIG. 3.

FIG. 5 is a front elevational view of the grab hook of this invention showing the same engaged with a length of chain.

FIG. 6 is a side elevational view corresponding to FIG. 5 taken in the plane of line 6—6 of FIG. 5.

FIG. 7 is a rear elevational view of the grab hook of this invention showing the same engaged with a length of chain and viewing the same from the opposite side of FIG. 5.

FIG. 8 is a side elevational view illustrating the manner in which the improved grab hook of this invention is engaged with a predetermined link of a length of coil chain.

FIG. 9 is a plan view, partly in section, taken in the plane of line 9—9 of FIG. 8, showing the manner of engaging the hook with a chain.

FIG. 10 is a side elevational view taken in the plane of line 10—10 of FIG. 8 further illustrating the manner of engaging the hook with a chain.

DESCRIPTION OF THE PREFERRED EMBODIMENT

Referring to FIG. 1, and by way of illustration only, the subject improved claw type grab hook, generally designated 1, is shown engaged with a length of coil chain 2 passed around a series of objects to be held in place by the chain and a load sustaining device engaged therewith. The objects in the embodiment illustrated are a series of logs, each designated L, stacked one upon the other and held in secure stacked engagement with each other by the chain 2 passed therearound.

In that connection, a load binding device having the improved hook of this invention operatively engaged therewith is generally designated 3 and is provided to draw the length of chain 2 tightly around the group of logs stacked on each other in known fashion. In that regard, various load sustaining devices may be utilized for that purpose, and one such device of a suitable construction is shown in aforementioned Ratcliff U.S. Pat. No. 3,271,007. Another improved load binder well suited for the intended purpose is shown in Ratcliff application Ser. No. 329,906, filed Feb. 5, 1973, now Pat. No. 3,842,426, dated Oct. 15, 1974. In that connection, if a load sustaining device of the load binder type shown in that Ratcliff patent or application is utilized, the subject claw type grab hook would be substituted therein for the claw type hook or conventional grab hook shown engaged therewith.

In that regard, the improved claw type grab hook of this invention, referring to FIG. 8, may be operatively engaged with the load sustaining device 3 by means of one or more chain links 4. One of such links would in turn be connected with a pivot member or swivel member 6 in the manner seen in said Ratcliff patent or in said Ratcliff application.

It should again be noted that the improved hook of this invention may be utilized in conjunction with any type of load sustaining device, such as a load binder of the type mentioned, a chain or rope hoist, or any other load sustaining device, by means of which a hook member is to be utilized to apply tension to a chain when the load sustaining device is actuated in known fashion.

As noted herein previously, the subject hook member is specifically designed so that the same may be easily and rapidly engaged with a predetermined chain link by moving the hook relative to the chain, rather than visa versa. Additionally, the present hook is designed to obviate damage to the chain following engagement therewith which is characteristic of conventional grab hooks of the type commonly used in the art heretofore. In that connection, such a conventional grab hook is illustrated in the Ratcliff U.S. Pat. No. 3,591,141, dated July 6, 1971. while such conventional grab hooks have the advantage of simplicity and low cost, the present improved claw type grab hooks possesses the same advantages, coupled with the ability to prevent damage to the chain with which the same is engaged.

As will be described hereinafter, the present claw type grab hook is designed to be moved laterally into engagement with a predetermined link 7' (FIGS. 5 through 8) of the coil chain 2 which precludes the necessity for manipulating the coil chain into engagement with the hook. Such manipulation has been found to be disadvantageous by certain users and in certain environments. To permit such lateral engagement, the present hook has been specifically contoured and designed to permit ease of engagement with a chain link.

In that regard, referring to FIGS. 2, 3 and 4, the improved hook is defined by a one piece metal body made in any suitable fashion, such as by forging the same from a suitably contoured blank. The hook body is defined by a flat shank portion 11 having an opening 12 therethrough designed to receive a chain link (such as link 4 shown in FIG. 8) therethrough by means of which the hook may be engaged with a suitable load sustaining device 3. The shank portion 11 defines one end of the hook which, at its other end, is defined by an integral bulbous chain engaging portion generally designated 13 which projects laterally of the shank portion.

As noted previously, the chain engaging portion 13 is specifically contoured to adapt the hook to be engaged with a chain in the non-damaging fashion similar to that known heretofore with respect to conventional claw hooks. However, with the present invention, manipulation of the chain into the hook is obviated during engagement of the two members due to the configuration of the hook member.

To that end, the chain engaging portion 13 is slotted and apertured to define an integral chain receiving recess internally thereof which is generally designated 14. That is, the chain engaging portion 13 is hollowed out and includes a central recessed area 16 perhaps best illustrated by the dotted lines in FIGS. 2 through 4. The central recessed area opens through the top of the hook by means of an elongated slot 17 which extends through the top wall 18 of the chain receiving portion 13. Similarly, the central recessed area opens through a front wall 19 of the chain receiving portion 13, by means of an elongated slot 21 as best seen in FIG. 2.

The top slot 17 is defined by opposing top wall sections 22 lying on opposite sides of the slot. Similarly, front slot 21 is defined by opposing front wall sections 23 lying on opposite sides of the slot.

Thus, the bulbous chain receiving portion 13 of the hook includes a laterally opening front wall slot 21 and an upwardly opening top wall slot 17, both of which are in communication with each other via the central open recessed area 16 of the hook.

Further referring to FIG. 4 it will be noted that the central recessed area further includes a recessed extension 24 thereof which lies internally on opposite sides of the laterally opening slot 21 and defines a generally flat or planar chain link receiving surface in which the link engaged by the hook may be seated when the hook and the chain are interengaged in the fashion seen in FIGS. 5 through 7. It should further be noted that the central recessed area 16 is contoured to receive the chain link 7' therein while links 7 and 7'' on opposite ends thereof project through top slot 17 and an opposed slot 25 formed through the bottom wall 26 of the bulbous portion 13.

Thus, as illustrated by the drawings in FIGS. 2 through 4, the central recessed area 16 of the hook is hollowed out so that the hook may be most effectively engaged with a length of chain in the manner seen in FIGS. 5 through 7.

As noted previously an advantage of the present hook member is its ability to be rapidly and easily engaged with a predetermined link 7' of a chain by first moving the hook laterally into engagement with an adjacent link 7, rather than requiring manipulation of the chain into engagement with the hook. Such mode of engagement is illustrated best by FIGS. 8 and 9 of the drawings. In that connection, as seen in the dotted line showing of FIG. 9 the hook is initially positioned so that the front slot 21 is upwardly oriented with the flat shank portion 11 thereof extending laterally of the chain to be engaged therewith. When thus positioned, it is merely necessary to move the hook laterally from the dotted line position to the solid line position shown in FIG. 9 to thereby engage the front wall of the hook engaging portion with the vertically oriented chain link 7. When the hook is positioned generally in the location shown in FIG. 9 in solid lines, it is merely necessary to pivot or rotate the flat shank portion 11 downwardly so that the adjacent link 7' will be straddled by the top wall of the chain engaging portion 13 in the manner seen in FIGS. 5 through 7. During such rotation, the enlarged central recessed area 16 adpats the hooks to accommodate a portion of adjacent link 7' to permit such straddle engagement.

When thus engaged, tension may be applied to the chain by tightening the load sustaining device 3 with which the load binder is operatively engaged.

To disengage the hook from the chain, it is merely necessary to reverse the described procedure.

When the hook is engaged with a predetermined link 7' of the chain, and is straddling the same in the manner seen in FIGS. 5 through 7, lateral disengagement of the hook from the chain is positively precluded, particularly when tension is applied to the hook by means of the load sustaining device 3 illustrated, or some other suitable load sustaining device operatively engaged with the hook.

when the hook and chain are engaged in the fashion shown in FIGS. 5 through 7, it will be noted that the chain is not distorted or twisted, or otherwise subjected to unusual forces, in that the tension applied to the link 7' of the chain engaged by the hook is directed generally in line with the line of pull defined by the length of chain itself. Thus, chain damage characteristic of prior known grab hooks which twisted or otherwise distorted the chain is obviated.

Having thus made a full disclosure of the improved claw type grab hook of this invention, reference is directed to the appended claims for the scope of protection to be afforded thereto.

I claim:

1. An improved claw type grab hook comprising a body defined by
   A. a single generally flat shank portion adapted to operatively connect said hook with an associated load sustaining device, and
   B. an enlarged bulbous chain engaging portion integral with said shank portion which projects laterally of said shank portion, comprising,
      1. a central recessed area,
      2. a top wall having a slot extending therethrough and communicating with said central recessed area,
      3. a front wall having a slot extending therethrough and communicating with said central recessed area,
         a. opposed portions of said front wall which define said front wall slot extending in generally the same plane as said flat shank portion, and
      4. a bottom wall having a slot extending therethrough also communicating with said central recessed area,
      5. whereby a chain link may be received within said central recessed area while adjacent links extend through said top and bottom walls,
   C. said slotted front wall permitting said hook to be moved laterally relative to one of said adjacent links until the same is received within said bottom wall slot, following which said hook may be rotated to straddle said chain link within said central recessed area and lie generally in line with the chain which includes said links.

2. The hook of claim 1 in which said first mentioned chain link is receivable generally entirely within said central recessed area when said adjacent links are projecting through said top and bottom walls.

3. The hook of claim 1 in which said central recessed area is enlarged to accommodate therein a portion of one of said adjacent links when said hook is rotated to straddle said first mentioned link.

4. An improved claw type grab hook adapted to be engaged in straddling relationship with a chain link without distorting or damaging such link and the chain which includes such link therein, said hook comprising a body defined by
   A. a single generally flat shank portion by means of which said hook body may be operatively engaged with an associated load sustaining device, such as a load binder, and
   B. a generally bulbous shaped enlarged chain engaging portion integral with said shank portion and positioned to extend generally laterally thereof at one end thereof, comprising
      1. a top wall having a slot therethrough,
      2. an opposed bottom wall having a slot therethrough, and
      3. a front wall having a slot therethrough communicating with and interconnecting said top and bottom slots,
         a. opposed portions of said front wall which define said front wall slot extending in generally the same plane as said flat shank portion,
      4. and a hollow central recessed area included in said chain engaging portion in communication with all said slots,
   C. said central recessed area and said slots permitting said hook body to be oriented to extend transversely of a length of chain and to be moved laterally relative to a predetermined link of said chain to be engaged by said hook until said link passes through said bottom and front slots, after which said hook body may be rotated into straddling engagement with a chain link next to said predetermined link, with the links adjacent said chain link positioned to extend through said top and bottom slots when said chain link is received within said central recessed area.

5. The hook of claim 4 in which said shank portion extends generally in the same direction as said chain links when said hook is rotated into said straddling engagement.

6. The hook of claim 4 in which said central recessed area is enlarged and imparts a generally hollow configuration to said chain engaging portion so that a chain link adjacent to and interconnected with said predetermined link may be accommodated within said recessed area as said hook body is rotated to said straddling position.

* * * * *